United States Patent
Teller et al.

(10) Patent No.: US 10,779,167 B2
(45) Date of Patent: *Sep. 15, 2020

(54) BALLOON CLUMPING TO PROVIDE BANDWIDTH REQUESTED IN ADVANCE

(71) Applicant: Loon LLC, Mountain View, CA (US)

(72) Inventors: Eric Teller, San Francisco, CA (US); William Graham Patrick, San Francisco, CA (US)

(73) Assignee: Loon LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/441,503

(22) Filed: Jun. 14, 2019

(65) Prior Publication Data

US 2019/0342760 A1   Nov. 7, 2019

Related U.S. Application Data

(63) Continuation of application No. 15/786,201, filed on Oct. 17, 2017, now Pat. No. 10,382,970, which is a continuation of application No. 13/470,677, filed on May 14, 2012, now Pat. No. 9,826,407.

(51) Int. Cl.
*H04W 16/04* (2009.01)
*H04L 12/911* (2013.01)

(52) U.S. Cl.
CPC .......... *H04W 16/04* (2013.01); *H04L 47/829* (2013.01)

(58) Field of Classification Search
CPC .................................................. H04W 16/04
See application file for complete search history.

(56) References Cited

U.S. PATENT DOCUMENTS

| | | | |
|---|---|---|---|
| 1,390,745 | A | 9/1921 | Armstrong |
| 3,119,578 | A | 1/1964 | Borgeson et al. |
| 3,390,853 | A | 7/1968 | Wykes |
| 3,614,031 | A | 10/1971 | Demboski |
| 3,807,384 | A | 4/1974 | Schach et al. |
| 4,113,206 | A | 9/1978 | Wheeler |
| 4,651,956 | A | 3/1987 | Winker et al. |
| 5,645,248 | A | 7/1997 | Campbell |
| 6,119,979 | A | 9/2000 | Lee et al. |

(Continued)

FOREIGN PATENT DOCUMENTS

| | | |
|---|---|---|
| CN | 1367988 A | 9/2002 |
| CN | 101057157 A | 10/2007 |

(Continued)

OTHER PUBLICATIONS

Notification of the Reexamination for Chinese Patent Application No. 201380030330.9, dated Jul. 17, 2018.

(Continued)

*Primary Examiner* — Ankur Jain
(74) *Attorney, Agent, or Firm* — Botos Churchill IP Law

(57) ABSTRACT

Methods and systems disclosed herein relate to determining a projected change in bandwidth demand in a specified area during a specified future time period, repositioning one or more balloons in a high-altitude balloon network based on the projected change in bandwidth demand, and providing, using the one or more balloons, at least a portion of the bandwidth demanded in the specified area during the specified future time period.

18 Claims, 7 Drawing Sheets

(56) References Cited

U.S. PATENT DOCUMENTS

| | | | |
|---|---|---|---|
| 6,167,263 A * | 12/2000 | Campbell | B64B 1/06 |
| | | | 244/164 |
| 6,324,398 B1 | 11/2001 | Lanzerotti et al. | |
| 6,830,222 B1 | 12/2004 | Nock et al. | |
| 7,555,297 B2 | 6/2009 | Hibbs et al. | |
| 8,116,763 B1 | 2/2012 | Olsen | |
| 2001/0000167 A1 * | 4/2001 | Chang | H04B 7/18504 |
| | | | 455/13.1 |
| 2002/0072361 A1 * | 6/2002 | Knoblach | H04B 7/18576 |
| | | | 455/431 |
| 2002/0167702 A1 * | 11/2002 | Badesha | B64G 5/00 |
| | | | 398/121 |
| 2006/0002326 A1 * | 1/2006 | Vesuna | H04W 16/18 |
| | | | 370/328 |
| 2008/0287124 A1 | 11/2008 | Karabinis | |

FOREIGN PATENT DOCUMENTS

| | | |
|---|---|---|
| JP | 2011166680 | 8/2011 |
| WO | 199733790 | 9/1997 |
| WO | 2012025769 | 3/2012 |

OTHER PUBLICATIONS

Supplementary European Search Report, dated Dec. 22, 2015, in European Application No. 13791154.1.

* cited by examiner

BALLOON CLUMPING TO PROVIDE BANDWIDTH REQUESTED IN ADVANCE

CROSS-REFERENCE TO RELATED APPLICATION

The present application is a continuation of U.S. application Ser. No. 15/786,201, filed on Oct. 17, 2019, which is a continuation of U.S. application Ser. No. 13/470,677, filed on May 14, 2012 and entitled "Balloon Clumping to Provide Bandwidth Requested in Advance," the disclosures of which are hereby incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In a first aspect, a method is provided. The method includes determining a projected change in bandwidth demand in a specific area during a specified future time period. The method also includes repositioning one or more balloons in a high-balloon network based on the projected change in bandwidth demand. The method also includes providing, using the one or more balloons in the high-altitude balloon network, at least a portion of the bandwidth demanded in the specified area during the specified future time period.

In a second aspect, a system is provided. The system includes at least one balloon. The at least one balloon is in a high-altitude balloon network. The system also includes a controller. The controller is configured to: i) determine a projected change in bandwidth demand in a specified area during a specified future time period; and ii) control a respective position of the at least one balloon based on the projected change in bandwidth demand. The at least one balloon is configured to provide at least a portion of the bandwidth demanded in the specified area during the specified future time period.

In a third aspect, a non-transitory computer readable medium having stored instructions is provided. The instructions are executable by a computing device to cause the computing device to perform functions. The functions include determining a projected change in bandwidth demand in a specified area during a specified future time period. The functions also include causing a controller to reposition one or more balloons in a high-altitude balloon network based on the projected change in bandwidth demand and causing the one or more balloons in the high-altitude balloon network to provide at least a portion of the bandwidth demanded in the specified area during the specified future time period.

These as well as other aspects, advantages, and alternatives, will become apparent to those of ordinary skill in the art by reading the following detailed description, with reference where appropriate to the accompanying drawings.

DETAILED DESCRIPTION

Figure 1:
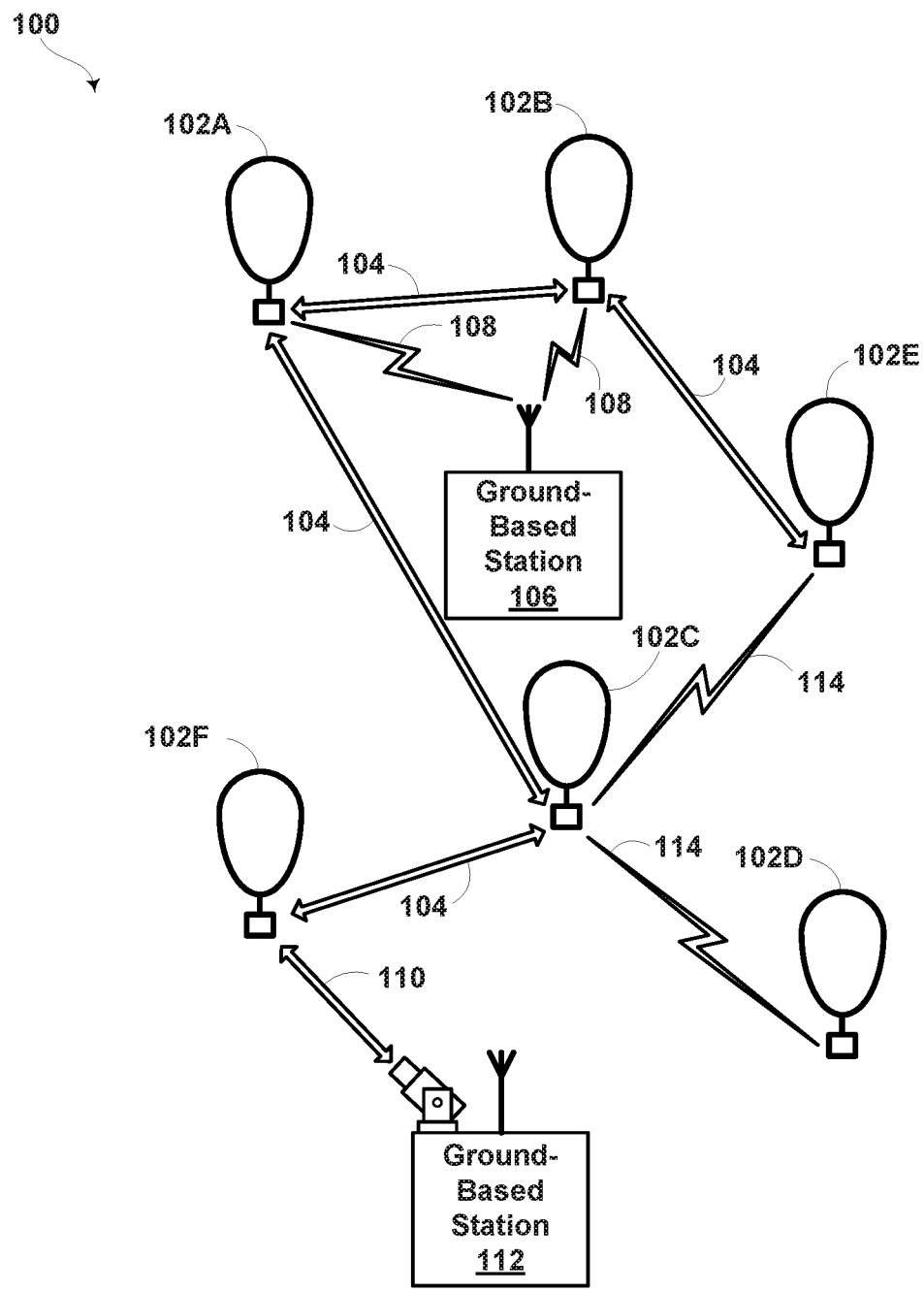
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to determining a projected change in bandwidth demand in a specified area during a specified future time period, repositioning one or more balloons in a high-altitude balloon network based on the projected change in bandwidth demand, and providing, using the one or more balloons, at least a portion of the bandwidth demanded in the specified area during the specified future time period.

In an example embodiment, such methods and systems could be used for network planning purposes. For example, the bandwidth needs in various areas may be anticipated, and the arrangement, number, and/or density of balloons within communication range and/or serving each area may be determined based upon a projected change in bandwidth demand. The balloons in the high-altitude balloon network may then be controlled in various ways so that they 'clump' over the desired areas based on the projected change in bandwidth demand.

In other words, it may be useful for balloons to 'clump' proactively in order to provide some or all of the bandwidth demanded in a specified area during a specified future time period in response to determining a projected change in bandwidth demand.

The projected change in bandwidth demand could be determined by receiving an advance bandwidth request. For example, if an event, such as a concert or a conference, is planned for a specific future time period at a specific venue, the organizers of the event could initiate an advance bandwidth request with the operators of the high-altitude balloon network to reserve or request a projected bandwidth to serve attendees at the event. In response to the request, one or more balloons in the high-altitude balloon network could be repositioned in order to provide the requested projected bandwidth during the event.

Methods disclosed herein could be carried out in part or in full by the one or more balloons in the high-altitude balloon network. For instance, a balloon in the high-altitude balloon network could receive the advance bandwidth request.

The advance bandwidth request could originate from a user of the balloon network. The user of the balloon network could represent an individual user, a corporate user, a government, or any other entity that may have an anticipated need for bandwidth (e.g., Internet services, communications services, etc.) at a specified future time period in a specified area.

Other ways of determining a projected change in bandwidth demand are possible. For example, the projected change in bandwidth demand could be determined based on a natural disaster, an event (e.g., a music concert, a calendar of events, etc.), or a historical record of bandwidth demand. The projected change in bandwidth demand could also be inferred based on available information, such as from news organizations and/or social media.

The high-altitude balloon network could be operable to reposition one or more balloons in an effort to provide at least a portion of the bandwidth demanded. In an example embodiment, repositioning the one or more balloon could include moving balloons to create a higher local balloon density over the specified area so as to fulfill the bandwidth need during the future time period.

The balloons in the high-altitude balloon network could be configured to provide at least a portion of the bandwidth demanded during the future time period. In other words, the balloons may provide an Internet connection at a specified bandwidth, communications services, computation power, data throughput, or other services to users in the specified area during the future time period. Other ways of providing at least a portion of the bandwidth demanded during the future time period are possible.

Other methods disclosed herein could be carried out in part or in full by a server and/or a server network. In an example embodiment, the projected change in bandwidth demand could be received, predicted, and/or inferred by a server network. The server network could act to reposition at least one balloon in the high-altitude balloon network based on the specified area, the specified future time period, and the projected change in bandwidth demand. The server network could also control the at least one balloon to provide at least a portion of the bandwidth demanded during the specified future time period in the specified area.

Other interactions between one or more balloons in a high-altitude balloon network and a server are possible within the context of the disclosure.

A system is also described in the present disclosure. The system could include at least one balloon in a high-altitude balloon network and a controller. The controller (e.g., a processor and a memory) could be configured to i) determine a projected change in bandwidth demand in a specified area during a specified future time period; ii) control a respective position of the at least one balloon based on the projected change in bandwidth demand. The at least one balloon could be configured to provide at least a portion of the bandwidth demanded in the specified area during the specified future time period.

It will be understood that the system could include more or fewer elements than those disclosed herein. Further the elements of the system could be configured and/or be operable to perform more or fewer functions within the context of the present disclosure.

In some embodiments, each of the elements of the system could be incorporated into at least one balloon in a high-altitude balloon network. In other embodiments, some or all of the elements of the system may be located apart from other elements of the system. Thus, the system could operate in a distributed manner.

Also disclosed herein are non-transitory computer readable media with stored instructions. The instructions could be executable by a computing device to cause the computing device to perform functions similar to those described in the aforementioned methods.

Those skilled in the art will understand that there are many different specific methods and systems that could be used in determining a projected change in bandwidth demand in a specified area during a specified future time period, repositioning one or more balloons in a high-altitude balloon network based on the projected change in bandwidth demand, and providing, using the one or more balloons, at least a portion of the bandwidth demanded in the specified area during the specified future time period. Each of these specific methods and systems are contemplated herein, and several example embodiments are described below.

2. Example Systems

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
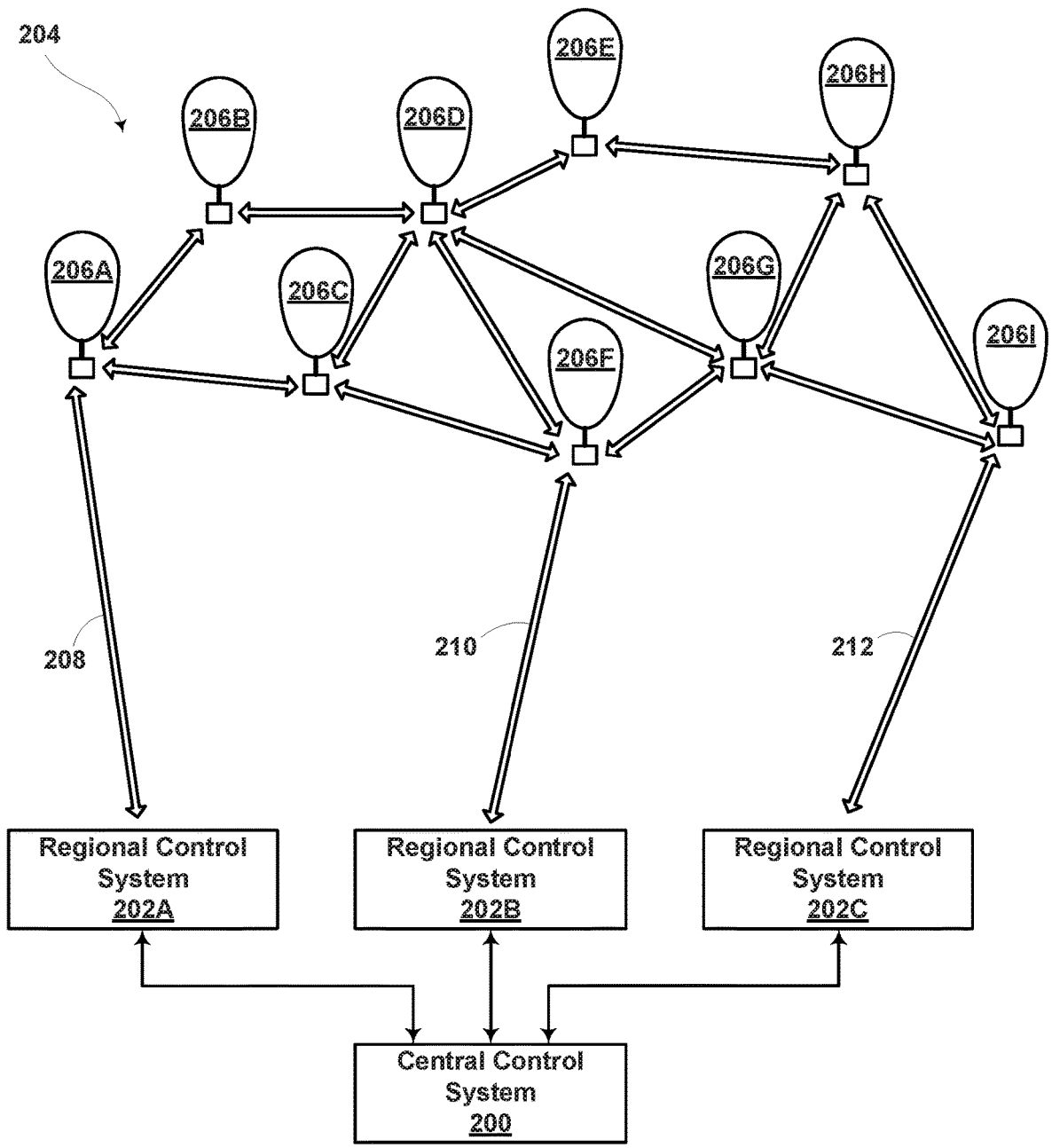
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, wherein $d_i$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
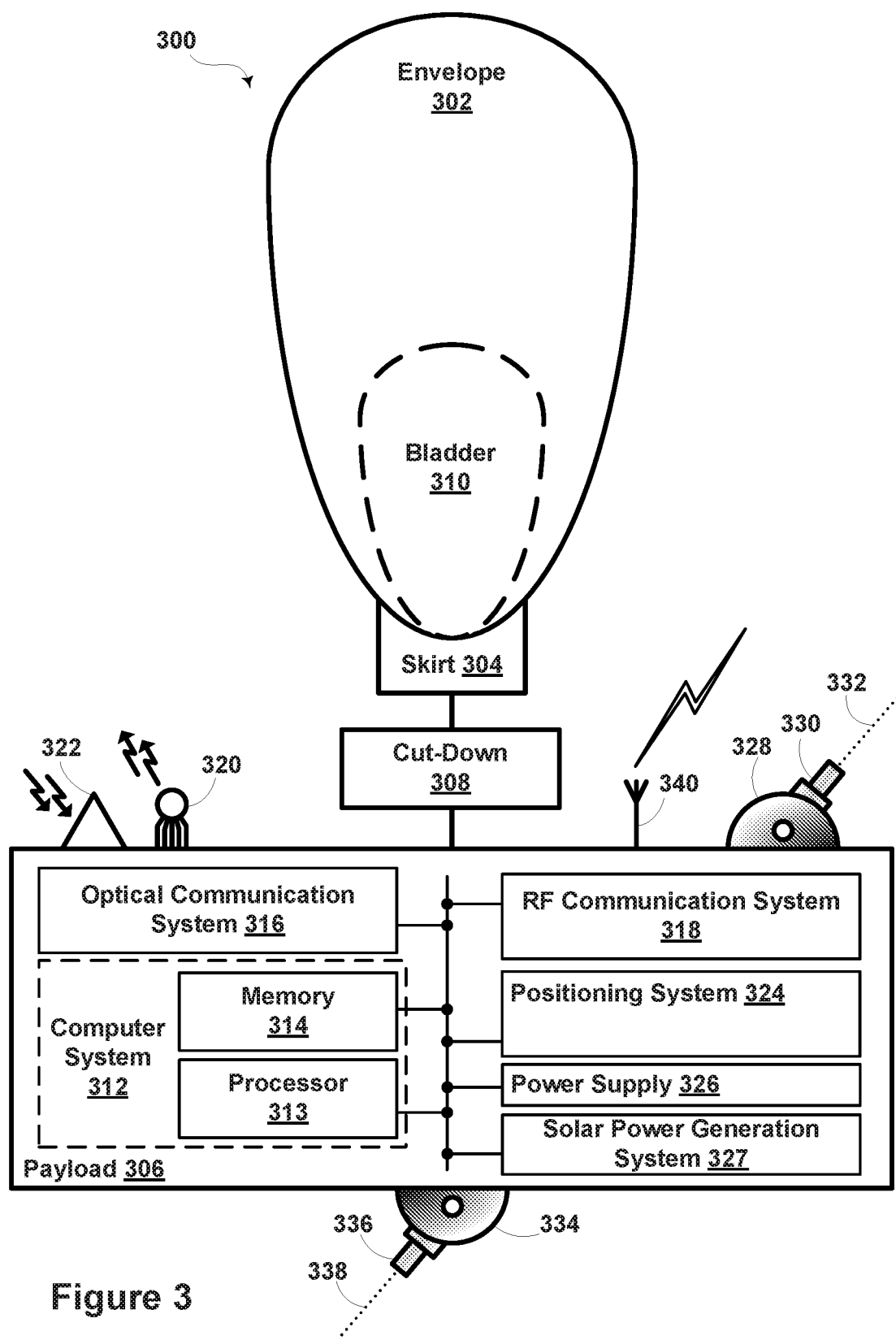
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 306.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a computer system 312 and further as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

2e) Example Heterogeneous Network

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
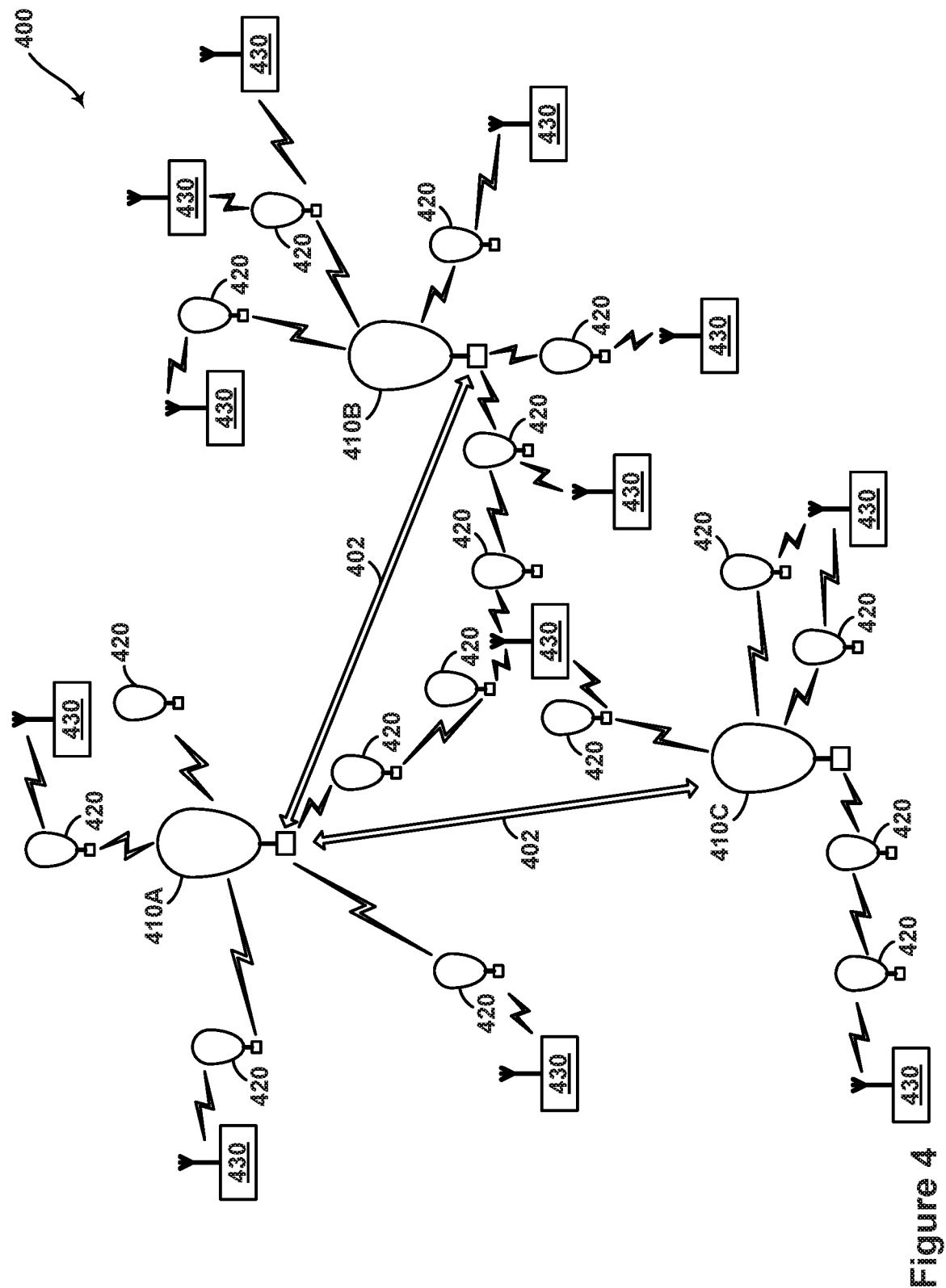
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 MBit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

Within the context of the present disclosure, any of the example systems described herein could be operable to carry out determining a projected change in bandwidth demand in a specified area during a specified future time period, repositioning one or more balloons in a high-altitude balloon network based on the projected change in bandwidth demand, and providing, using the one or more balloons, at least a portion of the bandwidth demanded in the specified area during the specified future time period. Several specific example implementations are described in further detail below.

3. Example Implementations

Several example implementations will now be described herein. It will be understood that there are many ways to implement the devices, systems, and methods disclosed herein. Accordingly, the following examples are not intended to limit the scope of the present disclosure.

Figure 5A:
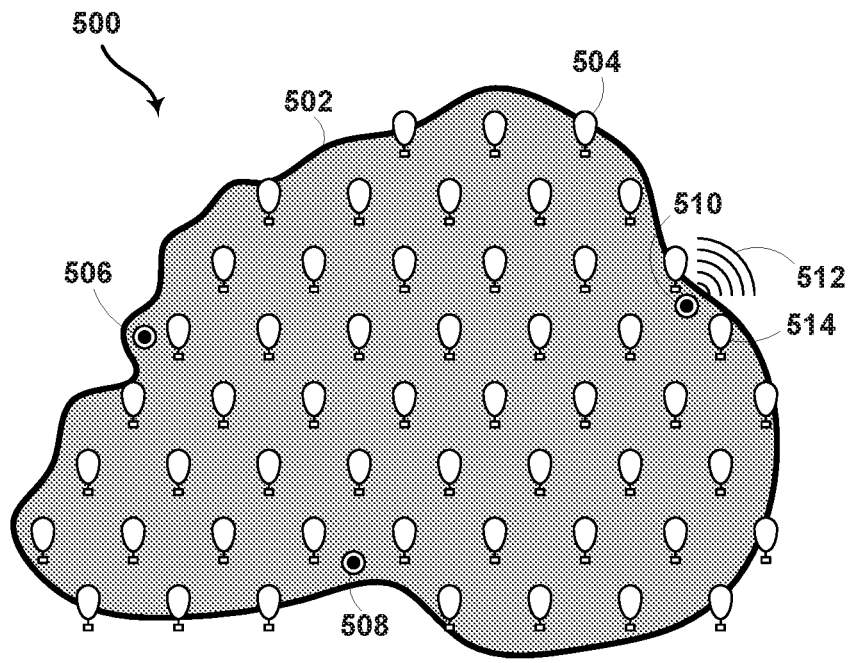
FIG. 5A illustrates a balloon network at a first time, according to an example embodiment.

FIG. 5A illustrates a balloon network at a first time. In a scenario 500, a land mass 502 could include several cities 506, 508, and 510. A balloon network 504 could include a plurality of balloons arranged in a substantially hexagonal array with approximately equal spacing between nearest neighbor balloons. Other arrangements of balloons are possible. For instance, the balloon network 504 could have a first arrangement of balloons. The first arrangement of balloons could include local densities of balloons that could vary based on, for instance, local population density and/or typical bandwidth needs.

During the first time (scenario 500), a determination regarding a projected change in bandwidth demand in a specified area during a specified future time period could be made. For example, in some embodiments, an advance bandwidth request 512 could be made by a user, a representative of one or more users, or another party. The advance bandwidth request 512 could include a projected change in bandwidth demand in a specified area during a specified future time period. In the example embodiment, the advance bandwidth request 512 could include a notification of a higher-than-normal anticipated bandwidth need. The advance bandwidth request 512 could originate from city 510, which may represent the specified area. In other embodiments, the advance bandwidth request 512 could originate from a location partially or wholly outside the specified area.

In some embodiments, the advance bandwidth request 512 could be received by at least one balloon in the high-altitude balloon network (balloon 514). In other embodiments, the advance bandwidth request 512 could be received by another recipient, such as a computer system or a server network.

The advance bandwidth request 512 could be in response to a known anticipated need such as a future concert, conference, sporting event, or any other reason. An advance bandwidth request 512 could also be initiated in response to an increased need due to an emergency, such as a natural disaster, that may reduce the capability of fixed communications equipment.

Figure 5B:
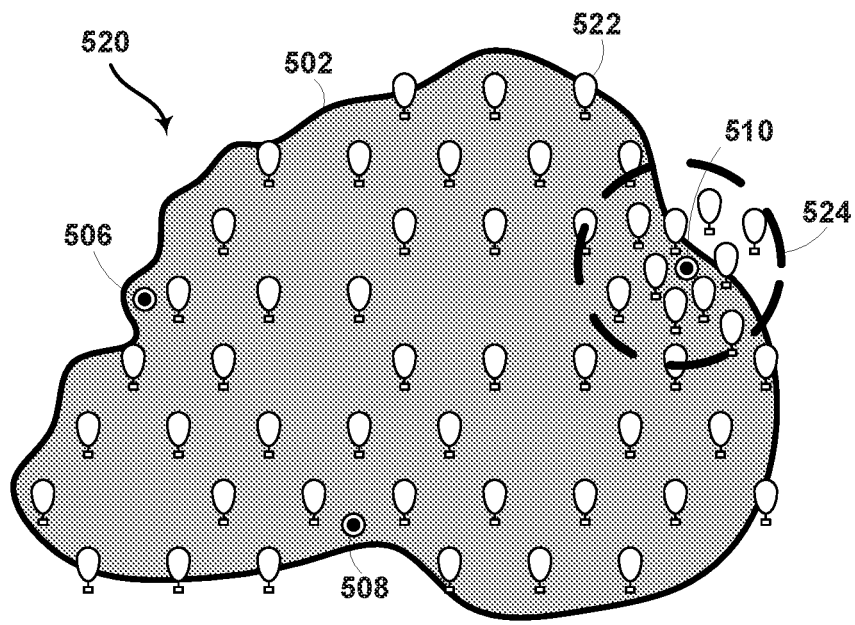
FIG. 5B illustrates a balloon network at a second time, according to an example embodiment.

FIG. 5B illustrates a balloon network at a second time. The second time could represent a point in time later than the first time. A scenario 520 could include the landmass 502 and the cities 506, 508, and 510. As compared to FIG. 5A, a balloon network 522 could be reconfigured compared to the balloon network 504 so as to provide the bandwidth demanded in the specified area at the specified future time period. For instance, the balloon network 522 could include a second arrangement of balloons that includes a locally higher density of balloons (a 'clump') around the specified area 524 which may have a higher-than-normal anticipated bandwidth need. The 'clump' of balloons may be operable to provide the bandwidth demanded as well as other data throughput, communication services, etc.

In order to increase the local density of balloons, the balloon network may reposition balloons from elsewhere in the balloon network to accommodate the change. Further, the balloons in the balloon network may be operable to provide at least a portion of the bandwidth demanded during the specified future time period in the specified area. The specified future time period could represent a specific point in time. Additionally or alternatively, the specified future time period could include a continuous or discontinuous set of times. The specified future time periods could be any time in the future. For example, an advance bandwidth request could include a specified future time period around a two-day music festival one week in the future. Other future time periods could be possible.

4. Example Methods

Figure 6:
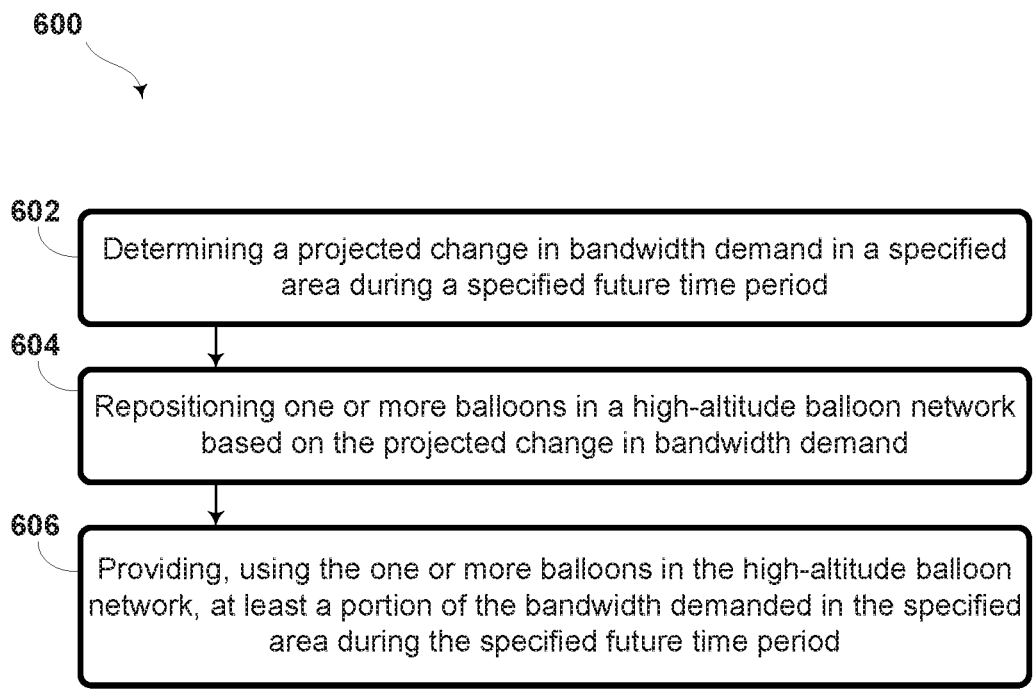
FIG. 6 is a flowchart illustrating a method, according to an example embodiment.

A method 600 is provided for determining a projected change in bandwidth demand in a specified area during a specified future time period. The method 600 further includes repositioning one or more balloons in a high-altitude balloon network based on the projected change in bandwidth demand, and providing, using the one or more balloons in the high-altitude balloon network, at least a portion of the bandwidth demanded in the specified area during the specified future time period. The method could be performed using any of the apparatus shown and described in reference to FIGS. 1-4, however, other configurations could be used. FIG. 6 illustrates the steps in an example method, however, it is understood that in other embodiments, the steps may appear in different order and steps could be added or subtracted.

Step 602 includes determining a projected change in bandwidth demand in a specified area during a specified future time period. The projected change in bandwidth demand could be received (e.g., in the form of an advance bandwidth request) by one or more balloons in the high-altitude balloon network. Alternatively, the advance bandwidth request could be received by another computer system and/or a server network. The projected change in bandwidth demand could also be calculated, inferred, or otherwise determined by the balloon(s) or by another computer system based on available information.

The projected change in bandwidth could represent a difference in the anticipated need for bandwidth during the specified future time period within the specified area compared to a previous bandwidth demand (e.g., a bandwidth demand based on a historical record). The specified future time period could represent a finite time period in the future or a future instant of time. The specified area could be a city, a region, a concert venue, a park, a metropolitan area, a building, or any other localized area that may require the specified projected bandwidth. The specified area could also alternatively or additionally represent a shipping lane, an airplane route, a road, or any other heavily-traveled route or area. Other types of specified areas are possible.

In some embodiments, the projected change in bandwidth could be determined based on an advance bandwidth request. The advance bandwidth request could be made by an individual user, a user delegate, a group of users, a company, an event organizer, a network planner, or any other entity that could anticipate a future need for bandwidth at a specified location.

Advance bandwidth requests could be originated from entities that need not be users of the high-altitude balloon network. For example, a city government could initiate an advance bandwidth request in advance of a music concert that could be scheduled for an upcoming evening at a stadium within the city limits. The advance bandwidth request could imply an increased bandwidth need in and around the stadium during the music concert even if the city government itself is not a user of the balloon network.

Determining the projected change in bandwidth demand could also be performed in an implicit manner based on available information. For example, a city government or other entity could publish an 'events calendar' that could be publicly available (e.g., via print media, a website, or social media). A controller of the balloon network could determine the projected change in bandwidth based on the publicly available information. For instance, the controller of the balloon network may anticipate greater than average bandwidth needs based on an upcoming public festival or air show and may anticipate lower than average bandwidth needs on days without many large events.

Some embodiments include determining the projected change in bandwidth demand by using inference techniques. For example, if for the last 10 Friday nights in a row there has been greater than average demand for bandwidth near a stadium, the controller of the balloon network may infer or project that the next Friday night will also include a greater than average demand for bandwidth near the stadium and so determine an increased need for bandwidth near that place at that time.

Advance bandwidth requests could include 'standing requests', which could be made by any individual or entity. The standing requests could include a projected change in bandwidth demand at a specified location based on one or more contingencies. For example, a media organization or an emergency services provider could make a standing request for a projected bandwidth at a future, unknown location of a natural disaster (e.g., fire, earthquake, flood, etc.). Upon a natural disaster occurring at a location, the high-altitude balloon network could act responsively so as to provide the bandwidth demanded at the location of the natural disaster in an effort to fulfill the standing request.

Determining a projected change in bandwidth demand could be performed on an as-needed basis. Alternatively or additionally, the determinations of projected changes in bandwidth demand could be made periodically or on an on-going basis in response to, for instance, real-time bandwidth needs. Such determinations also could be triggered automatically by various events. For instance, if a natural disaster occurs at a particular location, a service provider controlling the high-altitude balloon network could automatically determine a projected change in bandwidth demand for the particular location. Further, the service provider could specify a priority level (e.g., emergency priority-level access), which will be described below in more detail.

Random, but similar, events could also trigger a determination of a projected change in bandwidth demand. For example, a disaster event such as a fire could happen at any time at any location. Based on publicly accessible information (e.g., from news sources, social media, the Internet), an inference could be made about a projected change in bandwidth demand due to the specific fire location and specific fire size. For instance, a controller of the balloon network could monitor news reports for the location of a disaster event (which may suggest the number of individuals affected by the disaster due to, for instance, local population density) and the extent of the disaster (e.g., earthquake magnitude on the Richter scale, number of fire stations responding to a fire, etc.). Based on the information, an inference could be made regarding a possible bandwidth demand near the location of the disaster event. The controller may form an inference based on various information. For instance, the controller could have a historical record of bandwidth needs regarding similar disasters affecting similar number of individuals. Based on the historical record of bandwidth needs, the controller could make inferences regarding a projected change of bandwidth demand that could correspond to historical bandwidth needs from similar disaster events in the past.

Step 604 includes repositioning one or more balloons in a high-altitude balloon network based the projected change in bandwidth demand. The one or more balloons could be similar or identical to balloon 300 described in reference to FIG. 3. The high-altitude balloon network could be similar or identical to the balloon network described in reference to FIGS. 1, 2, and 4.

Repositioning the one or more balloons could include controlling the balloons to move with respect to other balloons in the balloon network and/or with respect to a geographic position, such as the specified area, based on the projected change in bandwidth demand. In an example embodiment, the one or more balloons could be operable to move in relation to one another and/or a geographic position by changing altitude so as to move toward a particular relative and/or absolute position. For instance, wind direction could vary depending upon altitude. Thus, by adjusting altitude, the one or more balloons could be directed to move towards a particular relative and/or absolute position. Other means of repositioning the one or more balloons are possible.

Repositioning the balloons could be based on the projected change in bandwidth demand in a specified area during a specified future time period. For example, if the specified future time period is months in advance, no immediate action need be taken upon determining the projected change in bandwidth demand. In such a case, a repositioning command could be carried out at a later time. The repositioning may also be dependent upon the specified area. If the projected change in bandwidth demand is higher than a predetermined threshold, repositioning could be performed so as to increase the local density of balloons near the specified area. In other words, the balloons could form a local 'clump' over the specified area based on the projected change in bandwidth demand. Conversely, if the projected change in bandwidth demand is less than a predetermined threshold, the repositioning could decrease the local density of balloons near the specified area.

Repositioning the balloons could be performed using commands to the balloons to move to specific locations and/or in specific directions. In an example embodiment, balloons outside communication range of the specified location could be directed to move toward the specified location in an effort to provide resources in order to provide the bandwidth demanded in the specified location. In another embodiment, balloons could be assigned a virtual attraction or repulsion force to one another based on the area over which they fly. For example, as balloons pass substantially over the specified location, a virtual attraction force could be increased so that higher densities of balloons naturally form over the specified location.

Alternatively, a controller of the high-altitude balloon network could adjust a 'goodness' function of the airspace substantially over the specified location in a reinforcement-type learning setting. The 'goodness' function could reflect the principle that, all things being equal, it is better to be over certain geographic areas than others. In other words, the controller could control the balloon network by assigning different 'desirabilities' to various geographic areas and/or regions of airspace. Balloons in the balloon network may be 'rewarded' for moving into a more 'desirable' airspace.

Repositioning the balloons could occur once (e.g., sending a single command to a balloon to move near the specified location at the specified time period). Alternatively, the repositioning could occur continuously upon determining a projected change in bandwidth demand, through the specified future time period, and for some time after the specified future time period. For example, upon determining a projected change in bandwidth demand, balloon repositioning may need to commence immediately (and continue at least until the beginning of the specified future time period) so as to prepare for the future bandwidth demand in the specified area.

Further, in order to satisfy at least part of the bandwidth demand of the specified area during the specified time period, balloons could be repositioned dynamically based on, for instance, wind currents over the specified area. In such cases, new balloons may be repositioned to join a 'clump' over the specified area during the specified time period, while other balloons may leave the 'clump' (e.g., because prevailing winds blew them out of the area).

After the specified time period, balloons may be repositioned in order to return to a previous balloon configuration, density, or other coverage arrangement. Other ways of repositioning balloons in a high-altitude balloon network are possible within the context of the disclosure.

Step 606 could include providing, using the one or more balloons in the high-altitude balloon network, at least a portion of the bandwidth demanded in the specified area during the specified future time period. Providing the demanded bandwidth could represent providing a specific amount of data throughput, communication services, Internet access, download capability, or bit rate, among other examples.

In some embodiments, the determination of a projected change in bandwidth demand could specify a target user and/or a priority level. Accordingly, the method could provide at least a portion of the bandwidth demanded in the specified area during the specified future time period to a specified target user and/or based on the priority level.

A target user could be a specific individual or a group of individuals. A target user could also represent users in a specific area or within a specific building. Other types of target users are possible.

The priority level could represent, for instance, an emergency or non-emergency priority. In other words, in an emergency situation, a determination could be made relating to a projected change in bandwidth demand with an 'emergency' priority level. Accordingly, balloons near the specified area where the bandwidth is needed could provide services preferentially (or only) to those with specific 'emergency' priority-level access. 'Emergency' priority-level access could be provided to first-responders, fire-fighters, police, dispatchers, other emergency personnel, news organizations, witnesses, or survivors, etc.

Additionally or alternatively, the priority level could be associated with various pricing levels (e.g., pay a higher rate for priority access to Internet bandwidth, etc.). For example, a basic level of communication services (e.g., limited download speeds, capped bandwidth, etc.) could be provided by the high-altitude balloon network for a basic fee. For an increased rate, a one-time payment, or another form of compensation, a higher level of services could be provided. The higher level of services could represent access to, or privileges for, higher data rates, removal of data cap amounts, etc. Other types of priority levels are possible.

Example methods, such as method 600 of FIG. 6, may be carried out in whole or in part by one or more balloons and their respective subsystems. Accordingly, example methods could be described by way of example herein as being implemented by the balloon. However, it should be understood that an example method may be implemented in whole or in part by other computing devices. For example, an example method may be implemented in whole or in part by a server system, which receives data from the balloon or from elsewhere. Other examples of computing devices or combinations of computing devices that can implement an example method are possible.

Those skilled in the art will understand that there are other similar methods that could describe determining a projected change in bandwidth demand in a specified area during a specified future time period, repositioning one or more balloons in a high-altitude balloon network based on the projected change in bandwidth demand, and providing at least a portion of the bandwidth demanded in the specified area during the specified future period of time. Those similar methods are implicitly contemplated herein.

Figure 7:
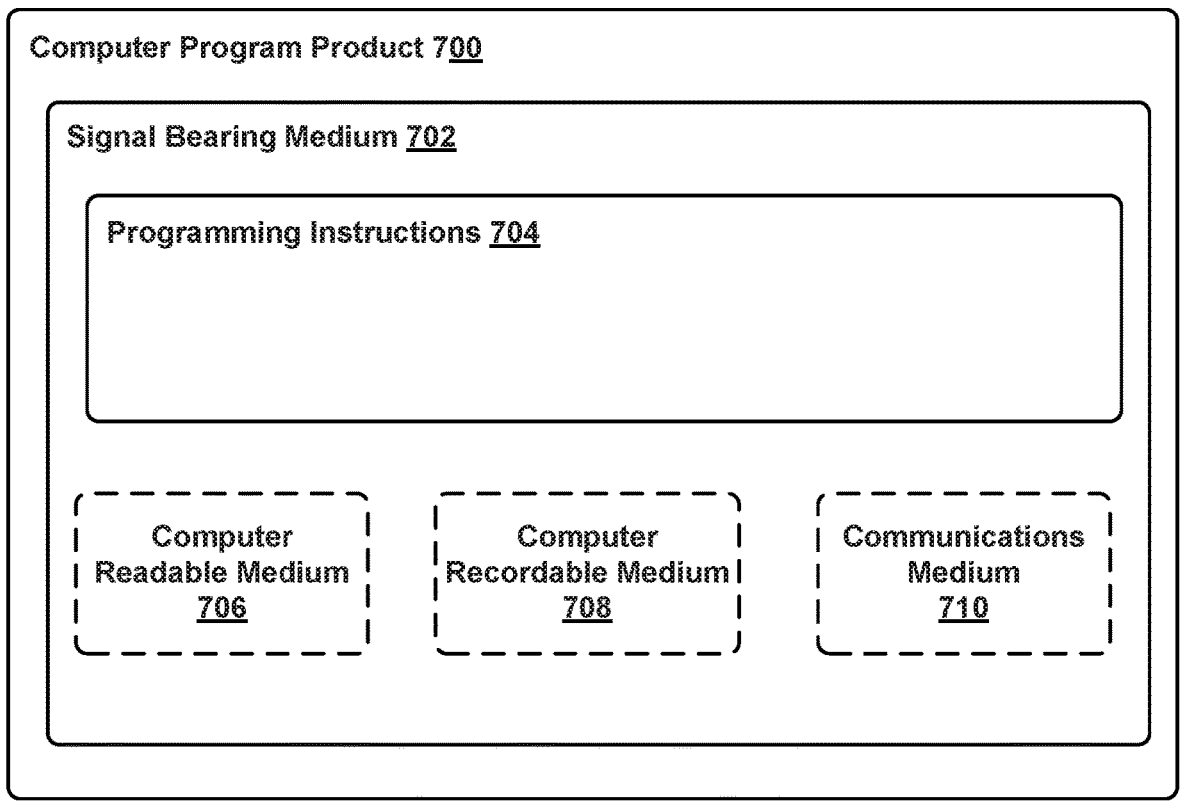
FIG. 7 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product that includes a computer program for executing a computer process on a computing device, arranged according to at least some embodiments presented herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may encompass a computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 312 of FIG. 3 may be configured to provide various operations, functions, or actions in response to the programming instructions 704 conveyed to the computer system 312 by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a device, such as the balloon 300 shown and described in reference to FIG. 3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
projecting, by one or more processors, a future bandwidth demand in a predetermined area at a future time period based on an anticipated bandwidth need;
before the future time period begins and based on the projected future bandwidth demand, causing one or more balloons of a plurality of balloons to move into airspace over the predetermined area;
determining a priority level related to the future bandwidth demand; and
causing the one or more balloons to provide bandwidth in the predetermined area to some users preferentially over other users during the future time period based on the priority level.

2. The method of claim 1, wherein the priority level corresponds to an emergency priority level.

3. The method of claim 1, wherein causing the one or more balloons to provide bandwidth includes providing bandwidth to a specified group of users.

4. The method of claim 3, wherein causing the one or more balloons to provide bandwidth includes providing bandwidth to only the specified group of users.

5. The method of claim 3, wherein the specific group of users are emergency service personnel.

6. The method of claim 3, wherein the specific group of users are news organization personnel.

7. The method of claim 1, wherein determining a priority level is based on a level of service for users of the bandwidth in the specified area during the specified future time period.

8. The method of claim 7, wherein the level of service corresponds to a rate paid for the bandwidth in the specified area during the specified future time period.

9. The method of claim 8, wherein a first rate corresponds to priority access to bandwidth and a second rate corresponds to limited access to bandwidth, and wherein the first rate is greater than the second rate, and the rate paid is one of the first rate or the second rate.

10. The method of claim 7, wherein the level of service corresponds to a download speed.

11. The method of claim 7, wherein the level of service corresponds to a particular capped bandwidth.

12. The method of claim 1, further comprising receiving an advance request identifying the anticipated bandwidth need in the predetermined area for the future time period.

13. The method of claim 12, wherein the anticipated bandwidth relates to a planned event in the predetermined area during the future time period.

14. The method of claim 13, further comprising receiving the advance request for bandwidth from a target user, and wherein causing the one or more balloons to provide the bandwidth includes providing bandwidth to at least the target user in the predetermined area during the future time period.

15. The method of claim 1, wherein providing bandwidth in the specified area during the specified future time period includes controlling a balloon network density over the predetermined area based at least on the future bandwidth demand.

16. The method of claim 15, wherein controlling the balloon network density includes increasing the balloon network density over the predetermined area based at least on the future bandwidth demand.

17. The method of claim 1, further comprising, after the future time period, repositioning the one or more balloons to a previous coverage arrangement.

18. The method of claim 1, wherein causing the one or more balloons to provide bandwidth in the predetermined area during the future time period includes causing the one or more balloons to provide bandwidth from outside the predetermined area.

* * * * *